(12) United States Patent
Akanda et al.

(10) Patent No.: US 11,299,142 B2
(45) Date of Patent: Apr. 12, 2022

(54) HYBRID ELECTRIC POWERTRAIN ARCHITECTURES AND CONTROL LOGIC FOR VEHICLE RESPONSE MANAGEMENT

(71) Applicant: GM GLOBAL TECHNOLOGY OPERATIONS LLC, Detroit, MI (US)

(72) Inventors: Anab A. Akanda, Ann Arbor, MI (US); Nicholas J. Kalweit, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 16/545,531

(22) Filed: Aug. 20, 2019

(65) Prior Publication Data

US 2021/0053553 A1 Feb. 25, 2021

(51) Int. Cl.
*B60W 20/15* (2016.01)
*B60W 20/11* (2016.01)
(Continued)

(52) U.S. Cl.
CPC ............ *B60W 20/15* (2016.01); *B60W 10/06* (2013.01); *B60W 20/11* (2016.01); *B60W 30/20* (2013.01);
(Continued)

(58) Field of Classification Search
CPC ...... B60W 20/15; B60W 20/11; B60W 10/06; B60W 30/20; B60W 2710/085;
(Continued)

(56) References Cited

U.S. PATENT DOCUMENTS 4,860,861 A 8/1989 Gooch et al.
4,889,012 A 12/1989 Dull
(Continued)

FOREIGN PATENT DOCUMENTS

JP 6354203 B2 9/2015

OTHER PUBLICATIONS

Gragert, S. and Gibbs, P.; What is the term used for the third derivative of position?; 1998; math.ucr.edu; pp. 1 (Year: 1998).*
(Continued)

*Primary Examiner* — Aniss Chad
*Assistant Examiner* — Chase L Cooley
(74) *Attorney, Agent, or Firm* — Quinn IP Law (57) ABSTRACT

Presented are hybrid electric vehicle (HEV) powertrains and control logic for vehicle response management, methods for making/operating HEV powertrains, and motor vehicles equipped with HEV powertrains. A method of controlling a hybrid powertrain includes receiving data indicative of a motor speed of a traction motor and torque commands for the motor, an engine, and an engine disconnect clutch (EDC). A vehicle controller uses a state observer module to estimate a jerk response based on the motor speed, and determines if the EDC is in a torque-transmitting active state. Responsive to the EDC being in the active state, the controller calculates an incremental feedback control signal that is predicted to reduce the estimated jerk based on the engine, motor, and clutch torque commands. One or more torque command signals are transmitted to the engine, motor and/or EDC to modulate a torque output thereof based on the incremental feedback control signal.

20 Claims, 4 Drawing Sheets

(51) Int. Cl.
*B60W 10/06* (2006.01)
*B60W 30/20* (2006.01)

(52) U.S. Cl.
CPC .............. *B60W 2510/0241* (2013.01); *B60W 2710/081* (2013.01); *B60W 2710/085* (2013.01); *B60Y 2200/92* (2013.01)

(58) Field of Classification Search
CPC ... B60W 2710/081; B60W 2510/0241; B60W 2050/0041; B60W 2510/1005; B60W 20/40; B60W 10/02; B60W 10/08; B60W 2510/081; B60W 2710/0666; B60W 2710/083; B60W 2710/027; B60W 2510/0208; B60W 2510/0275; B60W 2050/001; B60Y 2200/92; Y02T 10/40; Y02T 10/62; B60K 2006/4825; B60K 6/387

See application file for complete search history.

(56) References Cited

U.S. PATENT DOCUMENTS

| | | | |
|---|---|---|---|
| 5,947,243 | A | 9/1999 | MacDonald |
| 7,198,587 | B2 | 4/2007 | Samie et al. |
| 7,681,675 | B2 | 3/2010 | Samie et al. |
| 7,824,292 | B2 | 11/2010 | Samie et al. |
| 7,862,437 | B2 | 1/2011 | Clark et al. |
| 7,878,935 | B2 | 2/2011 | Lahr |
| 7,931,561 | B2 | 4/2011 | Otanez et al. |
| 7,980,992 | B2 | 7/2011 | Sturgin |
| 8,011,464 | B2 | 9/2011 | Samie et al. |
| 8,029,403 | B2 | 10/2011 | Lee et al. |
| 8,042,669 | B2 | 10/2011 | Samie et al. |
| 8,042,670 | B2 | 10/2011 | Bartos et al. |
| 8,056,690 | B2 | 11/2011 | Samie et al. |
| 8,061,496 | B2 | 11/2011 | Samie et al. |
| 8,083,042 | B2 | 12/2011 | Samie et al. |
| 8,087,502 | B2 | 1/2012 | Samie et al. |
| 8,177,677 | B2 | 5/2012 | Samie et al. |
| 8,196,724 | B2 | 6/2012 | Samie et al. |
| 8,202,198 | B2 | 6/2012 | Samie et al. |
| 8,287,411 | B2 | 10/2012 | Lee et al. |
| 8,296,020 | B2 | 10/2012 | Lee et al. |
| 8,348,796 | B2 | 1/2013 | Samie et al. |
| 8,357,069 | B2 | 1/2013 | Diemer et al. |
| 8,371,982 | B2 | 2/2013 | Lee et al. |
| 8,371,984 | B2 | 2/2013 | Diemer et al. |
| 8,409,053 | B2 | 4/2013 | Samie et al. |
| 8,425,364 | B2 | 4/2013 | Lahr |
| 8,454,466 | B2 | 6/2013 | Samie et al. |
| 8,469,847 | B2 | 6/2013 | Lee et al. |
| 8,478,498 | B2 | 7/2013 | Lee et al. |
| 8,494,738 | B2 | 7/2013 | Lee et al. |
| 8,499,912 | B2 | 8/2013 | Samie et al. |
| 8,540,065 | B2 | 9/2013 | Samie et al. |
| 8,606,709 | B2 | 12/2013 | Gupta |
| 8,622,186 | B2 | 1/2014 | Samie et al. |
| 8,655,525 | B2 | 2/2014 | Samie et al. |
| 10,288,159 | B2 | 5/2019 | Li et al. |
| 10,293,674 | B1 | 5/2019 | Wilton |
| 10,807,601 | B1 * | 10/2020 | Cho ..................... B60W 10/06 |
| 2005/0126878 | A1 | 6/2005 | Samie |
| 2010/0273603 | A1 | 10/2010 | Roses et al. |
| 2012/0090952 | A1 | 4/2012 | Lee et al. |
| 2014/0251744 | A1 | 9/2014 | Steinberger et al. |
| 2015/0031501 | A1 | 1/2015 | Tolkacz et al. |
| 2015/0197245 | A1 * | 7/2015 | West ..................... B60W 10/06 701/22 |
| 2016/0046281 | A1 * | 2/2016 | Nedorezov ......... F02N 11/0851 701/22 |
| 2017/0328455 | A1 | 11/2017 | Li et al. |
| 2017/0328456 | A1 | 11/2017 | Samie et al. |
| 2018/0163793 | A1 | 6/2018 | Jeong et al. |
| 2018/0281778 | A1 * | 10/2018 | Zhang ................... B60W 10/02 |
| 2018/0355962 | A1 | 12/2018 | Lahr et al. |
| 2019/0168731 | A1 | 6/2019 | Lee et al. |

OTHER PUBLICATIONS

Vinodh Kumar, E. Jovitha, J.; Ayyappan, S.; Comparison of four State observer design algorithms for MIMO systems; 2013, Archives of Control Sciences; vol. 23(LIX); pp. 1, 18-20 (Year: 2013).*
Shaohua Wang, Bin Xia, Chunrong He, Sheng Zhang and Dehua Shi; Mode transition control for single-shaft parallel hybrid electric vehicle using model predictive control approach; Apr. 10, 2018; SAGE, Advances in Mechanical Engineering vol. 10(5) 1-10; pp. 5-9 (Year: 2018).*
Amir Arabi, H. Osman, Optimum Linear Quadratic Regulator Control for Dry Clutch Starting up of Automatic Manual Transmissions, Article published in the International Journal of Computers Communications & Control, ISSN 1841-9836 (2017), 23 pages.
A. Haj-Fraj, F. Pfeiffer, Optimal Control of Gear Shift Operations in Automatic Transmissions, Article published in the Journal of the Franklin Institute 338 (2001), pp. 371-390.

* cited by examiner

FIG. 5 ated States Patent No. US 11,299,142 B2

HYBRID ELECTRIC POWERTRAIN ARCHITECTURES AND CONTROL LOGIC FOR VEHICLE RESPONSE MANAGEMENT

INTRODUCTION

The present disclosure relates generally to motor vehicle powertrains. More specifically, aspects of this disclosure relate to hybrid electric powertrain architectures and control strategies for vehicle response management.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and efficiency. Such engines include compression-ignited (CI) diesel engines, spark-ignited (SI) gasoline engines, two, four, and six-stroke architectures, and rotary engines, as non-limiting examples. Hybrid electric and full electric ("electric-drive") vehicles, on the other hand, utilize alternative power sources to propel the vehicle, for instance an electric motor generator, and therefore minimize or eliminate reliance on a fossil-fuel based engine for tractive power.

A full electric vehicle (FEV)—colloquially identified as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. Since hybrid vehicles are able to derive their power from sources other than the engine, hybrid electric vehicle (HEV) engines may be turned off, in whole or in part, while the vehicle is propelled by the electric motor(s).

There are three primary types of hybrid vehicle powertrain architectures employed in automotive applications: parallel hybrid, series hybrid, and series-parallel ("power-split") hybrid configurations. Series hybrid architectures, for example, derive all tractive power from electric motors and therefore eliminate any driving mechanical connection between the engine and final drive members. In this case, the engine functions solely as a regenerative energy source, driving an electric generator that charges the vehicle's onboard traction battery pack. By way of comparison, the engine and motor/generator assemblies in parallel hybrid architectures each has a driving mechanical coupling to the power transmission and, thus, the vehicle's road wheels. As the name implies, series-parallel hybrid architectures combine features from both parallel hybrid and series hybrid powertrains. With gas-only, electric-only, and motor-assist operating modes, the engine and motor work independently or jointly—in parallel or in series—depending on the desired vehicle speed, overall vehicle power demand, and state-of-charge (SOC)/state of health (SOH) of the resident battery pack.

One of the many available types of parallel hybrid powertrains is the parallel two-clutch (P2) architecture, which may be typified by a single engine, an automatic power transmission, and a single motor/generator unit (MGU) that is "side attached" between the engine and transmission in parallel power-flow communication to the engine. Mechanically interposed between the engine and motor is a disconnect clutch that, unlike a standard torque converter lockup clutch, drivingly disengages the engine from both the motor and transmission. The engine disconnect clutch allows the MGU to be operated independent of the engine to propel the vehicle or regenerate the traction battery pack more efficiently during vehicle deceleration and braking while the engine is drivingly detached from the transmission. The P2 architecture also helps to eliminate engine friction during regenerative braking operations, and allows the motor/generator to recover more energy. Comparatively, the electric machine ("E-machine") in a P0 mild-hybrid architecture is connected, e.g., via chain or belt drive, on the front-end accessory drive (FEAD) of the internal combustion engine. For P1 architectures, the E-machine is connected directly to the engine's crankshaft, whereas the E-machine in P3 architectures is connected directly to the power transmission, e.g., through a gear train.

SUMMARY

Presented herein are hybrid electric powertrain architectures and attendant control logic for vehicle response management, methods for making and methods for operating such hybrid electric powertrains, and motor vehicles with a P2 HEV powertrain and improved drive quality during transient vehicle operations. By way of example, control methods are presented for mitigation of undesirable vehicle responses in P2 hybrid powertrain architectures during engagement and disengagement of a controller-actuated ("active") engine disconnect clutch. An HEV powertrain may experience occupant-perceptible fluctuations in fore-aft first-derivative acceleration—colloquially known as "vehicle jerk"—when switching operating modes from, for example, electric mode to hybrid mode. To mitigate such vehicle jerk, a powertrain controller modulates propulsion motor torque, K0 clutch actuation, and/or engine torque commands to cancel transient disturbances. The powertrain controller may directly operate on motor-level or vehicle-level jerk response (second derivative of speed) and incremental control as a cost function. Vehicle jerk may be estimated from motor speed feedback, e.g., by utilizing a Kalman-based state observer. A linear control paradigm, such as an incremental proportional-integral (PI) control module or a model-based control module (e.g., linear-quadratic regulator (LQR) or model predictive control (MPC)) may be used to compute a control signal to minimize or otherwise eliminate vehicle jerk response. In this process, the controller maintains a substantially constant fore-aft vehicle acceleration and, thus, improves drive quality during engine disconnect clutch (EDC) operation.

Attendant benefits for at least some of the disclosed HEV architectures, powertrain controllers, and control logic include improved drive quality by reducing undesirable vehicle response during engagement/disengagement of a K0-launch engine disconnect clutch. Such improvements in drive quality during EDC actuation through disclosed jerk control techniques make it possible to execute an electricto-hybrid mode "flying start" maneuver with the torque converter clutch (TCC) closed at low gears. In addition to reducing vehicle jerk, disclosed features also help to improve vehicle fuel economy as the torque converter may be mechanically locked at low vehicle speeds thereby reducing losses associated with TC slippage. Other related benefits may include compensating for slow response of a two-path torque converter lockup clutch.

Aspects of this disclosure are directed to methods for making and methods for operating any of the disclosed vehicle powertrains, powertrain controllers, and motor vehicles. In an example, a method is presented for controlling a hybrid powertrain of a vehicle. The hybrid powertrain includes, among other things, an engine and a motor that are operable, independently and/or collectively, to drive one or more of the vehicle's road wheels. A hydrodynamic torque converter (TC) with a torque converter clutch (TCC) may be interposed between and drivingly connect the engine and a power transmission. The hybrid powertrain also includes an engine disconnect clutch for selectively engaging and disengaging the engine to/from the motor, and a resident or remote programmable controller for controlling the motor, engine, and EDC.

The above representative method includes, in any order and in any combination with any of the above and below options and features: receiving, e.g., via the controller from a motor speed sensor, one or more sensor signals indicative of the motor's speed; receiving, e.g., via the controller from a hybrid operating system (HOS), data indicative of an engine torque command for the engine, a motor torque command for the motor, and a clutch torque command for the EDC; determining, e.g., via the controller using a state observer module, an estimated (vehicle or motor) jerk as a second derivative of speed based on the motor speed, engine speed, and a jerk reference or transmission and TCC state data, determining, via the controller based on the clutch torque command, whether the EDC is in a torque-transmitting active state or a non-torque-transmitting inactive state; calculating, e.g., via the controller responsive to the EDC being in the active state and the TCC slipping, an incremental feedback control signal that is predicted to minimize the estimated jerk and is and based on the engine, motor, and clutch torque commands; and transmitting, via the controller, one or more torque command signals to the engine, motor and/or EDC to modulate a torque output thereof based on the incremental feedback control signal.

Additional aspects of this disclosure are directed to electric-drive vehicles and hybrid electric powertrains with improved ride quality through vehicle response management. As used herein, the terms "vehicle" and "motor vehicle" may be used interchangeably and synonymously to include any relevant vehicle platform, such as passenger vehicles (REV, PHEV, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels and other standard original equipment. An internal combustion engine is mounted inside an engine bay of the vehicle body and operates alone or in conjunction with a single or multiple traction motors to drive one or more of the road wheels to thereby propel the vehicle. A multi-speed power transmission is also mounted to the vehicle body and drivingly connected to the engine's crankshaft and motor's rotor. The transmission receives, modifies, and outputs the torque generated by the traction motor and ICE assembly to the vehicle's road wheels. An EDC is operable to drivingly disconnect the engine from both the traction motor and power transmission.

Continuing with the discussion of the above example, the motor vehicle also includes a resident vehicle controller that is programmed to receive data indicative of the traction motor's real-time speed, the ICE assembly's real-time speed, and respective torque commands for the ICE assembly, the traction motor, and the EDC. Using a state observer module, the vehicle controller determines an estimated (vehicle or motor) jerk as a second derivative of speed based upon at least the motor speed of the traction motor. The controller also determines whether the EDC is in a torque-transmitting active state and whether a slip speed of a TCC is above a calibrated reference slip speed. If yes to both, an incremental feedback control signal for minimizing the estimated jerk is calculated based on at least the engine, motor, and clutch torque commands. The controller then transmits one or more torque command signals to the engine, motor and/or EDC to modulate a torque output thereof based on the incremental feedback control signal.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
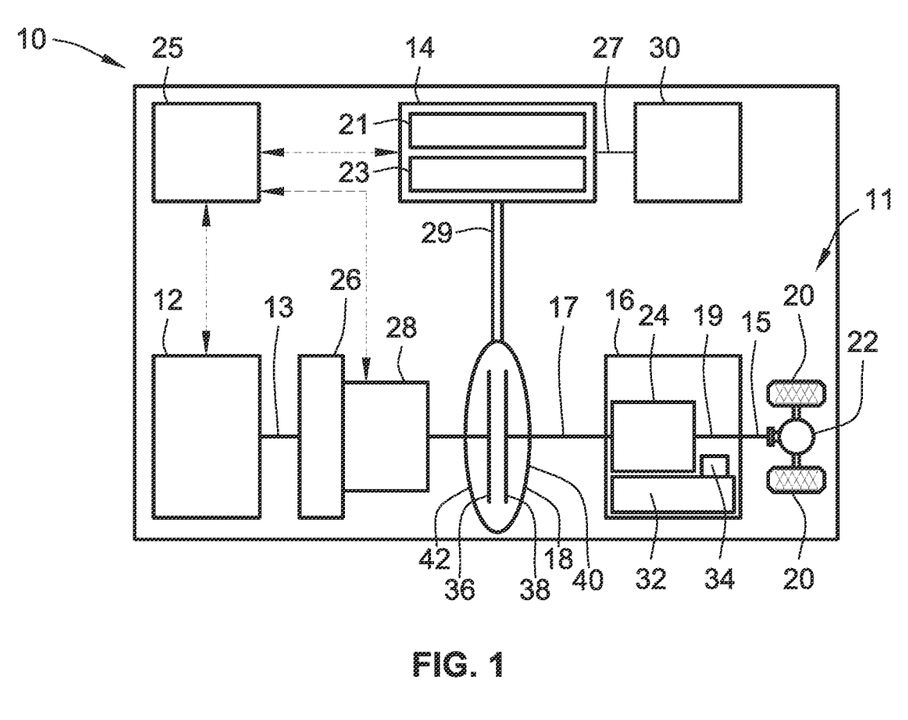
FIG. 1 is a schematic illustration of a representative electric-drive motor vehicle with a hybrid powertrain having an engine assembly and an electric traction motor drivingly connected to a final drive system via a multi-speed power transmission in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10 also referred to herein as "motor vehicle" or "vehicle" for short—is merely an exemplary application with which novel aspects and features of this disclosure can be practiced. In the same vein, implementation of the present concepts into a P2-hybrid powertrain should also be appreciated as an exemplary application of the novel concepts disclosed herein. As such, it will be understood that aspects and features of the present disclosure can be applied to other vehicle powertrain architectures and utilized for any logically relevant type of motor vehicle. Lastly, only select components have been shown and will be described in additional detail herein. Nevertheless, the vehicles, powertrains, and control systems discussed below may include numerous additional and alternative features, and other available peripheral components, for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16 (also referred to herein as "multi-speed power transmission" or merely "transmission" for brevity). The engine 12 transfers power, preferably by way of torque via an engine crankshaft 13 ("engine output member"), to an input side of the transmission 16. According to the illustrated example, the ICE assembly 12 rotates an engine-driven torsional damper assembly 26 and, through the torsional damper assembly 26, an engine disconnect device 28. This engine disconnect device 28, when operatively engaged, transmits torque received from the ICE assembly 12 by way of the damper 26 to input structure of the TC assembly 18.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to activate the elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit 14 or other suitable traction motor that operatively connects via a motor support hub, shaft, or belt 29 ("motor output member") to torque converter 18, and via torque converter 18 to an input shaft 17 ("transmission input member") of the transmission 16. The motor/generator unit 14 may be directly coupled to a TC input shaft or drivingly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including P2.5, P3 and P4 hybrid powertrains, any of which may be adapted for an REV, PHEV, range-extended hybrid vehicle, fuel-cell hybrid vehicle, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and disconnect device 28. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 25 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the turbine and impeller blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Disclosed hybrid electric vehicle powertrain architectures and control logic offset or otherwise cancel driveline oscillation when engaging the engine disconnect clutch, e.g., during K0 launch, flying start, and other transient vehicle operations. The powertrain control module uses delta/incremental control and motor-level or vehicle-level jerk—a second derivative of speed—as a cost function. In a representative implementation, motor torque output is modulated during and after EDC engagement and TCC lockup to achieve a substantially zero jerk at either the motor level (e.g., using motor feedback and a jerk reference) or the vehicle level (e.g., using a plant model of the driveline). A desired motor torque is modified by the controller to cancel the natural change in driveline acceleration caused by closing the clutch and coupling the engine with the driveline. Disturbance cancellation may be accomplished by manipulating a single signal, such as motor torque while considering engine and clutch torque as well as road disturbance as feedforward signals, or multiple signals, such as motor, clutch, and engine torques.

Figure 2:
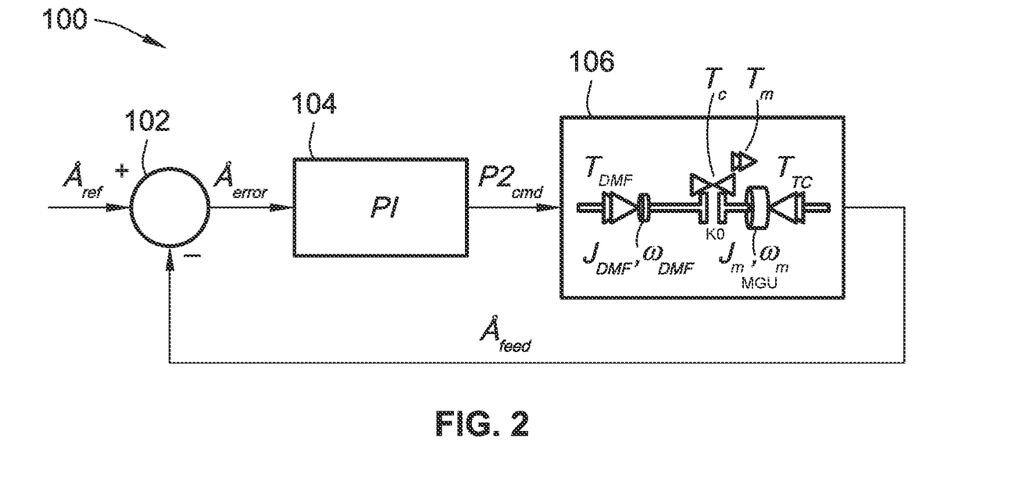
FIG. 2 is a schematic illustration of a representative incremental proportional-integral (PI) jerk control system in accordance with aspects of the present disclosure.

Cost function minimization may be accomplished with a single or multiple PI controllers (e.g., one for each of the engine, motor, and K0 clutch) to implement, in incremental form, minimization of motor-level jerk response to abate driveline disturbance, as seen with reference to the PI jerk control system 100 of FIG. 2. Cost function minimization may also be achieved by a model-based method to curtail vehicle-level jerk response using a three or four-state, physics-based driveline observer to estimate unmeasured states, derive random parts of the disturbance, and feedforward deterministic parts, as seen with reference to the model-based jerk control system 200 of FIG. 3. A model-based, multiple-input and multiple-output (MIMO) control method may be employed, including linear quadratic Gaussian (LQG)/learning to rank (LTR), model predictive control (MPC), and Dynamic Programming techniques. For at least some applications, a model-based incremental formulation is employed such that many different model-based control paradigms may be applied. LQG/LTR may provide simplicity and efficiency for real-time implementations and minimal opportunity for online optimization due to a short time horizon of the EDC engagement event. Incremental control of actuator torque modulation helps to avoid integrator wind-up and issues with "bumpless" transfer of control back to the Hybrid Operating System (HOS). It also helps to enable situations where gains are switched (e.g., slipping clutch vs. locked/sticking clutch), and allows a smooth handoff between the flying engine start using the motor and handing authority back to a supervisory controller for real-time, steady-state dynamic driveline management.

In PI form, the powertrain controller may be active during gear-state transitions as well as during TC lockup clutch transition to provision real-time operation, e.g., when the gear-state of a step-gear automatic transmission is not fixed. Additionally, a-dot vehicle jerk as a cost function to govern vehicle response is advantageous as it does not necessitate the use of motor speed control concomitant with defining an ideal speed trajectory. Using a model-based approach, by comparison, allows the controller to retain many benefits of the PI implementation while further adding the ability to compensate for system actuator and sensor delays. Model-based approaches may focus on attenuating fundamental torsional resonance of the driveline, which may offer the largest contribution to drive quality. Disclosed HEV powertrain control designs are robust, less sensitive to vehicle/part/condition variations, and greatly simplify in-vehicle controller calibration. Other attendant benefits may include providing for TCC lockup while in EV mode and low transmission gears during a flying start without sacrificing drive quality. PI-based jerk control may also enable active damping of driveline disturbance during simultaneous execution of flying start and transmission shift.

Generally speaking, a "flying start" may be typified as a powertrain switch from a motor-only EV operating mode to a motor-engine hybrid operating mode when vehicle speed is greater than zero (0) mph. A flying start maneuver in a P2 HEV powertrain may generally comprise the following sequence of events: as the powertrain is operating in a "pure EV" mode, the vehicle is propelled solely by the electric traction motor with the engine turned off. During steady-state operation, a pedal request is received from the driver to increase vehicle speed and, thus, axle torque. Responsively, the system initiates a K0-clutch closure process while concomitantly commanding the traction motor to temporarily fill the driver-requested torque demand. As engine's crankshaft progressively reaches target speed, it is fired; the engine accelerates and approaches sync speed with the motor. When the K0-launch EDC pressure reaches clamping torque, it is fully closed; the vehicle continues to accelerate in HEV mode.

With reference to FIG. 2, the PI jerk control system 100 receives a jerk reference $Å_{ref}$ of zero (0) and a jerk feedback $Å_{feed}$ at a difference selector 102. A jerk error $Å_{error}$ is determined by taking the mathematical difference between the jerk reference $Å_{ref}$ and jerk feedback $Å_{feed}$, with the final difference provided from the difference selector 102 as an input signal to a PI controller 104. The PI controller 104, in turn, generates a motor torque command $P2_{cmd}$ that is output to a P2 hardware module 106. PI jerk control system 100 helps to estimate driveline jerk, for instance, in scenarios where vehicle wheel jerk or motor jerk cannot be directly measured and a control-oriented model of the driveline is not available. Noise-free, on-line estimation of jerk from measured motor speed may be enabled through kinematics equations and use of a Kalman filter. An observer may be employed to estimate jerk from speed feedback; jerk minimization may be characterized as a regulation problem with no reference signal to follow. Therefore, it is advantageous to develop a good estimate of the frequency content of jerk response; the absolute value may be deemed less critical. The PI controller may be an event-based device that is only operational during EDC engagement (e.g., activated by a supervisory controller when a flying-start maneuver is initiated). The PI controller may then be turned off after a bumpless pass-through based on calibrated criterion, such as when slip speed across the EDC falls below a threshold value and/or a time-out event has occurred.

In the case of a PI controller, a model of the plant physics may not be defined. As such, a "Constant Snap" kinematic model may be constructed to derive a state-transition matrix that is used in a Kalman Observer. The states of this kinematic model may be defined as: speed ω; acceleration α; jerk J; snap s; and sampling interval T. Then the state vector is $X=[\omega\ \alpha\ J\ s]^T$ and the state transition matrix $\Phi$ is given by $$\Phi = \begin{bmatrix} 1 & T & T^2/2 & T^3/6 \\ 0 & 1 & T & T^2/2 \\ 0 & 0 & 1 & T \\ 0 & 0 & 0 & 1 \end{bmatrix}$$

and the Kalman Filter equations are given by:

$$\bar{x}(k) = \Phi\hat{x}(k-1) + \Gamma w(k-1) \quad \text{(Prediction)}$$
$$\hat{x}(k) = \bar{x}(k) + L[y(k) - H\bar{x}(k)] \quad \text{(Correction)}$$
$$y(k) = Hx(k) + v(k) \quad \text{(Measurement)}$$
$$H = [1\ 0\ 0\ 0];$$

$$\text{Kalman Gain: } L = \begin{bmatrix} L_1 \\ L_2 \\ L_3 \\ L_4 \end{bmatrix};$$

$$\text{Weights: } \Gamma = \begin{bmatrix} \Gamma_1 \\ \Gamma_2 \\ \Gamma_3 \\ \Gamma_4 \end{bmatrix};$$

y(k): Measured speed w(k): Process noise v(k): Measurement noise

Kalman filter gain matrix L may be calculated on-line or off-line, where an on-line Kalman filter may be implemented in a stand-alone c-code. All matrix manipulation involved in the calculation—including inversion—may be expanded and converted to simple algebraic expressions for maximum speed of execution in real time. In the foregoing analysis, there may be a single measured quantity: motor speed. Consequently, during on-line Kalman filter gains calculations, matrix inversion may be avoided by taking advantage of sparsity of the output matrix H. The frequency response of estimated jerk may be adjusted by changing the filter parameters, namely the elements of weight vector Γ.

Incremental PI methodologies (a.k.a "velocity algorithm"), as the name suggests, minimizes a response quantity by adding to or subtracting from a feed-forward control command signal generated by a Hybrid Operating System supervisory controller. A practical advantage of this approach is that bumpless transfer of control between supervisory and event-based vehicle controllers is built-in. Secondly, the method also makes it possible to enforce constraints, such as torque rate and range limits of the actuator, by imposing a restriction on the incremental command. To boot, integrator wind-up is also avoided by imposing a saturation limit on the incremental command. However, transfer of control from the PI controller back to the HOS controller or open-loop may require a separate bump-transfer logic. The motor torque control signal may be expressed as:

$$U_k = U_{k-1} + \Delta U_{ff} + \Delta U_{fb}$$

where $$\Delta U_{fb} = \Delta P + \Delta I = K_P*(e_k - e_{k-1}) + K_I*(e_k + e_{k-1})*\Delta T/2$$

where $U_k$ is a control command at a $k^{th}$ time step; where $U_{k-1}$ is a prior control command at a $k-1^{th}$ time step; $\Delta U_{fb}$ is an incremental contribution from the PI controller; $\Delta U_{ff}$ is an incremental feed-forward command; $e_k$ is a jerk error at the $k^{th}$ time step; $\Delta T$ is a sampling interval; $\Delta U_{fb}$ is a feedback signal that includes a proportional term, $K_P(e_k - e_{k-1})$, and an integral term, $K_I(e_k + e_{k-1}) \Delta T/2$ (Tustin approximation). $\Delta U$ may be constrained by a torque-rate limit (Nm/s) calibration value, while U may be constrained by a torque limit (Nm) calibration value. The PI controller may be implemented in c-code with the compiled code interfacing with a commercial simulation software, such as AMESIM®, using a standard API. Driving jerk towards zero leads to constant acceleration. An event-based controller manipulates motor torque to reduce jerk while maintaining commanded axle torque at a steady level during K0 clutch actuation.

Figure 3:
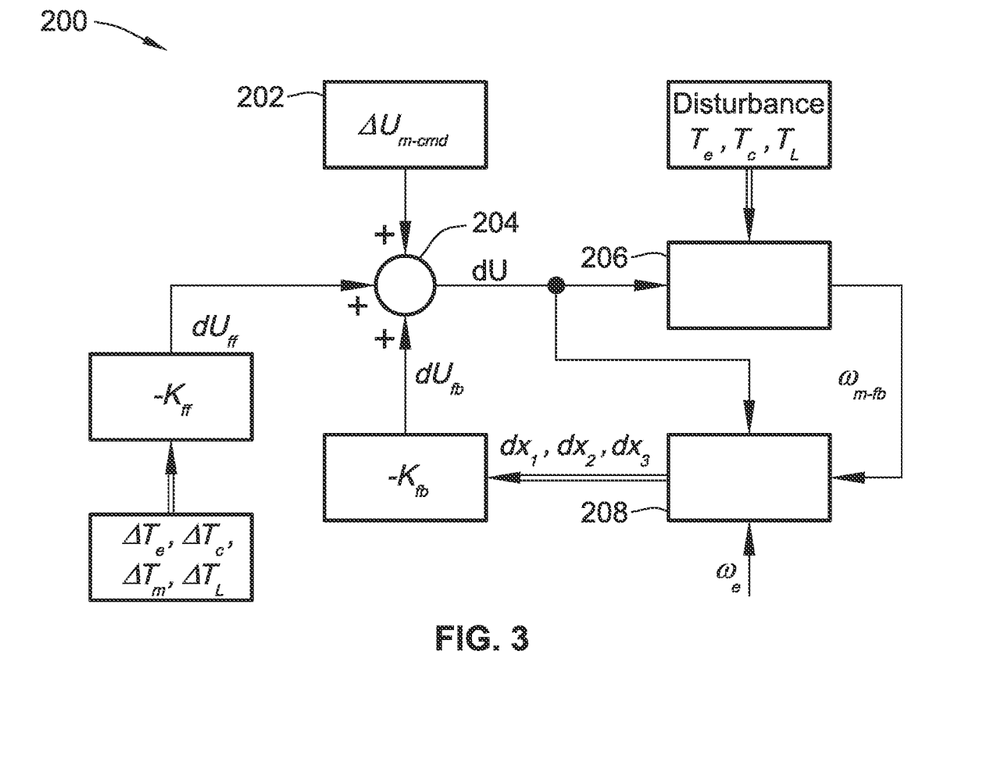
FIG. 3 is a schematic illustration of a representative linear model-based jerk control system in accordance with aspects of the present disclosure.

Model-based jerk control system 200 of FIG. 3 may use a multi-state observer model to estimate driveline states, with vehicle-level jerk response as a cost function while utilizing linear control techniques, such as LQG or MPC, to derive optimal incremental control commands for the individual torque actuators. A list of states for a 3-state or a 6-state model-based controller may comprise, in any combination: (1) relative rotational angle between engine output and EDC input (a dual-mass flywheel (DMF) isolator may be interposed between the engine's crankshaft and the EDC's input plate/race); (2) relative rotational angle between EDC output and vehicle wheel (e.g., windup of the driveline between P2 motor input and vehicle wheel); (3) engine rotational speed $\omega_e$; (4) DMF secondary rotational speed $\omega_{DMF}$ (e.g., disconnect clutch input node); (5) P2 motor speed $\omega_m$; and (6) vehicle wheel rotational speed $\omega_v$. As an aside, if the TCC is locked, it may be characterized as a direct mechanical path and, thus, may be omitted from the model.

Dynamics of a driveline typically involves numerous non-linear elements, such as the multi-rate DMF, the torque converter, and the TC lockup clutch. With the following assumptions in place, a simplified linear time-invariant (LTI) control-oriented model of the plant may be derived for vehicle jerk mitigation. A first assumption may be that the slip speed across the K0-launch EDC does not change sign while the controller is active. This assumption generally holds during execution of a flying start if the engine speed is kept below the traction motor speed during EDC engagement. This assumption makes it possible to simplify the clutch model as a linear function of commanded clutch pressure p(t), as follows:

$$T_c = \mu * n * A * R * p(t) * \text{sgn}(\dot{\theta}_e - \dot{\theta}_m) \rightarrow T_c = \mu * n * A * R * p(t)$$

where $T_c$ is a clutch torque; $\dot{\theta}_e$ is a derivative of engine rotational angle; $\dot{\theta}_m$ is a derivative of motor rotational angle; $\mu$ is an equivalent coefficient of clutch friction; n is a number surfaces; A is an area of each surface; and R is an effective clutch radius.

Closing the K0-launch EDC during a flying start tends to excite various torsional vibration modes of the driveline. A fundamental torsional mode—sometimes called the "shuffle mode"—may be the most readily perceptible to an occupant of a vehicle. Generally, in automatic transmissions, the torque converter provides some damping to reduce this type of vibration. However, if the TCC is locked, the system may be lightly damped such that transient disturbances are not sufficiently assuaged. This leads to a second assumption, which is the torque converter's TCC is closed and, thus, the TC assembly is locked. This assumption may help to avoid modeling the complex non-linear dynamics of a hydrodynamic torque converter. Another assumption may be that the transmission gear shift is temporarily suspended during K0 engagement; this helps to simplify the dynamics of the transmission. If some or all of the assumptions are invalid, it is still possible to derive linearized equations with more complex control algorithms. Finally, driveline lash effect may be ignored. In a model-based controller, lash can be accommodated by augmenting additional states and necessary logic.

With the above assumptions in mind, a flying start event may be separated into three distinct phases: (1) K0 clutch fully open; (2) K0 slipping; and (3) K0 fully closed. The first two phases may be described by a six-state linear state-space model derived from the governing equations of motion. Parameters of the model may be defined as:

Equivalent Drive-line Stiffness and Damping:

$$K = \frac{K_{Prop} K_{Axle}}{K_{Prop} i_f^2 + K_{Axle}};$$

$$C = \frac{C_{Prop} C_{Axle}}{C_{Prop} i_f^2 + C_{Axle}}$$

where $$K_{Axle} = \frac{2 K_{Tire} K_{DriveShaft}}{K_{Tire} + K_{DriveShaft}};$$

$$C_{Axle} = \frac{2 C_{Tire} C_{DriveShaft}}{C_{Tire} + C_{DriveShaft}}$$

$B_v \rightarrow$Equivalent vehicle speed dependent viscous damping

DMF linear stiffness & damping: $K_d$, $C_d$

Equivalent Inertia:

$J_e \rightarrow$Engine+DMF Primary;

$J_d \rightarrow$DMF Secondary;

$J_{Trans} \rightarrow$Transmission inertia in $i^{th}$ gear reflected @P2 motor;

$J_m = (J_{Motor} + J_{Trans}) \rightarrow$Equivalent Motor;

$J_{mEQ} = (J_{Motor} + J_{Trans} + J_d)$ Equivalent Motor+DMF secondary;

$J_{wheel} \rightarrow$Wheel;

$J_v = (2 J_{wheel} + M r_{wheel}^2) \rightarrow$Vehicle;

Gear Ratio:

$i_t \rightarrow$Transmission gear ratio;

$i_f \rightarrow$Final drive ratio;

where

Variables:

$\theta_e \rightarrow$Engine rotation angle;

$\theta_d \rightarrow$DMF secondary rotation angle;

$\theta_m \rightarrow$Motor rotation angle;

$\theta_v \rightarrow$Vehicle wheel rotation angle;

$\psi_{dmf} \rightarrow$DMF twist angle;

$\psi_{drv} \rightarrow$Driveline twist angle;

Input Torque:
$T_e \rightarrow$ Engine Torque;
$T_c \rightarrow$ Clutch Torque;
$T_m \rightarrow$ Motor Torque;
$T_L \rightarrow$ Load Torque;

Let us define the states for K0 open and slipping phase as follows $$x_1 = \psi_{dmf} = (\theta_e - \theta_d);$$
$$x_2 = \psi_{drv} = \left(\frac{\theta_{in}}{i_t} - i_f \theta_d\right);$$
$$x_3 = \dot{\theta}_e;$$
$$x_4 = \dot{\theta}_d;$$
$$x_5 = \dot{\theta}_m;$$
$$x_6 = \dot{\theta}_v;$$

This leads to six first order differential equations of motion as follows $$\dot{x}_1 = (x_3 - x_4);$$
$$\dot{x}_2 = \left(\frac{x_5}{i_t} - i_f x_4\right);$$
$$J_e \dot{x}_3 = T_e - K_d x_1 - C_d(x_3 - x_4)$$
$$J_d \dot{x}_4 = T_c - K_d x_1 - C_d(x_3 - x_4)$$
$$J_m \dot{x}_5 = T_m - T_c - \frac{K}{i_t} x_2 - \frac{C}{i_t}\left(\frac{x_5}{i_t} - i_f x_6\right)$$
$$J_v \dot{x}_5 = -T_L - B_v x_6 + i_f K x_2 + i_f C\left(\frac{x_5}{i_t} - i_f x_6\right)$$

When the engine reaches sync speed, the DMF speed becomes equal to the motor speed and the DMF secondary inertia $J_d$ combines with the motor inertia $J_m$; therefore, during sticking phase, the number of states reduces from six to five.

As noted above, the cost function of a model-based (LQR) controller is vehicle-level wheel jerk. In general, jerk may be deemed proportional to a rate of change of applied torque. Therefore, it may be easier to develop the control model in incremental form: the input and output are control commands and state response increments. The vehicle external load is generally approximated by three terms: (i) a viscous wheel speed dependent loss; (ii) Rolling friction, and (iii) nonlinear wind resistance. In incremental form, the derivative of rolling resistance may be ignored. Additionally, it may be assumed that a rate of change of wind resistance is small compared to other sources during clutch engagement. The linear wheel speed dependent viscous loss term, $B_v \dot{\theta}_v$ may be readily included in the state-space model. In summary, external load and it's derivative may be assumed to be as follows:

$$T_L = r_w[\mu_{roll} M g \cos(\alpha) + M g \sin(\alpha) + \rho C_w A_f r_w^2 \dot{\theta}^2_v];$$
$$\dot{T}_L \approx 0$$

It is now straightforward to extract the coefficient matrices of the state-space representation. The transition from slipping to sticking phase may be handled by zero-padding; zero-padding may be done after the continuous models are discretized.

In order to rapidly verify and tune the powertrain controller(s) during a flying start maneuver using a model-based control algorithm for vehicle jerk control, a reasonably accurate but simplified driveline plant model of the driveline may be derived. It may be desirable, for at least some implementations, that the plant model capture fundamental torsional dynamics of the powertrain system. For this purpose, a simplified version of the detailed non-linear model of a P2 HEV system may be developed. The powertrain's traction motor may be represented by a mechanical inertia coupled to a corresponding torque-speed map. Similarly, the engine may be represented by a corresponding pedal map. The primary inertia of the DMF may be lumped with the engine inertia while the secondary inertia is connected to it by a spring and damping; it is single-stage linear representation of the DMF. The K0-launch EDS may be assumed to follow a non-linear hyperbolic tangent clutch model. Finally, a half-shaft, a prop-shaft, and other compliant elements may be lumped together as an equivalent spring-damper system.

The transmission model may be simplified as an equivalent inertia (e.g., rejected at the motor side) with a defined gear ratio. In order to capture a "worst case" scenario for drive-quality, it may be assumed that the TC lock-up clutch is closed during the maneuver; thus, dynamics of torque converter may be ignored. Tire slip may also be ignored and drive-line lash may be deactivated. The controllers may be written in c-language, complied and linked with the simulation software utilizing it's API, and written to mimic a digital controller interacting with the simulated plant. To this end, a pulse-train signal block may be input to the c-code for enforcing zero order hold (ZOH) and code execution. For some implementations, the sampling interval may be assumed to be about 6.25 ms, and a rate-limit of 15,000 Nm/s may be enforced on the motor torque production. A sensor delay of one sampling interval may also be enforced on the engine and motor speed feedback signal. Motor (actuator) time delay may be assumed to be zero (i.e., rate-limit enforced).

The state-space equations for the six-state linear system may be expressed for the two phases as follows:

K0 clutch Phases: i) Slipping (SL) ii) Sticking (ST)

$$\dot{x} = A_{SL}x + B_{SL}u + B_{SL1}w_{SL};$$
$$\dot{x} = A_{ST}x + B_{ST}u + B_{ST1}w_{ST};$$
$$y_{SL} = C_{SL}x + Du;$$
$$y_{ST} = C_{ST}x + Du$$

where $$A_{SL} = \begin{bmatrix} 0 & 0 & 1 & -1 & 0 & 0 \\ 0 & 0 & 0 & 0 & \frac{1}{i_t} & -i_f \\ \frac{K_d}{J_e} & 0 & -\frac{C_d}{J_e} & \frac{C_d}{J_e} & 0 & 0 \\ \frac{K_d}{J_d} & 0 & \frac{C_d}{J_d} & -\frac{C_d}{J_d} & 0 & 0 \\ 0 & -\frac{K}{i_t J_m} & 0 & 0 & -\frac{C}{J_m i_t^2} & \frac{C i_f}{J_m i_t} \\ 0 & \frac{K i_f}{J_v} & 0 & 0 & \frac{C i_f}{J_v i_t} & -\left(\frac{C i_f}{J_v} + \frac{B_v}{J_v}\right) \end{bmatrix}$$

$$B_{SL} = \begin{bmatrix} 0 \\ 0 \\ 0 \\ 0 \\ \frac{1}{J_m} \\ 0 \end{bmatrix}; B_{SL1} = \begin{bmatrix} 0 & 0 & 0 \\ 0 & 0 & 0 \\ \frac{1}{J_e} & 0 & 0 \\ 0 & \frac{1}{J_d} & 0 \\ 0 & -\frac{1}{J_m} & 0 \\ 0 & 0 & -\frac{1}{J_v} \end{bmatrix}$$

$$A_{ST} = \begin{bmatrix} 0 & 0 & 1 & -1 & 0 \\ 0 & 0 & 0 & \frac{1}{i_t} & -i_f \\ -\frac{K_d}{J_e} & 0 & -\frac{C_d}{J_e} & \frac{C_d}{J_e} & 0 \\ \frac{K_d}{J_{mEQ}} & -\frac{K}{i_t J_{mEQ}} & \frac{C_d}{J_{mEQ}} & -\left(\frac{C_d}{J_{mEQ}} + \frac{C}{J_{mEQ} i_t^2}\right) & \frac{C i_f}{J_{mEQ} i_t} \\ 0 & \frac{K i_f}{J_v} & 0 & \frac{C i_f}{J_v i_t} & -\left(\frac{C i_f}{J_v} + \frac{B_v}{J_v}\right) \end{bmatrix}$$

$$B_{ST} = \begin{bmatrix} 0 \\ 0 \\ \frac{1}{J_{mEQ}} \\ 0 \end{bmatrix}; B_{ST1} = \begin{bmatrix} 0 & 0 & 0 \\ 0 & 0 & 0 \\ \frac{1}{J_e} & 0 & 0 \\ 0 & \frac{1}{J_{mEQ}} & 0 \\ 0 & 0 & -\frac{1}{J_v} \end{bmatrix}$$

$D = 0;$
$u = T_m;$
$w_{SL} = [\, T_e \;\; T_c \;\; T_L \,]^T,$
$w_{ST} = [\, T_e \;\; T_m \;\; T_L \,]^T$ $$C_{SL} = \begin{bmatrix} 0 & \frac{K i_f}{J_v} & 0 & 0 & \frac{C i_f}{J_v i_t} & -\left(\frac{C i_f^2}{J_v} + \frac{B_v}{J_v}\right) \end{bmatrix}$$
$$C_{ST} = \begin{bmatrix} 0 & \frac{K i_f}{J_v} & 0 & \frac{C i_f}{J_v i_t} & \left(\frac{C i_f^2}{J_v} + \frac{B_v}{J_v}\right) \end{bmatrix} \Bigg\} \text{Vehicle Acceleration}$$

After discretization, the equations for the two phases may be expressed in compact form as follows:

$$\Delta x(k+1) = (1-\alpha)(\Phi_{SL}\Delta x(k) + \Gamma_{SL}\Delta u(k) + \Gamma_{SL1}\Delta w_{SL}(k)) +$$
$$\alpha(\Phi_{ST}\Delta x(k) + \Gamma_{ST}\Delta u(k) + \Gamma_{ST1}\Delta w_{ST}(k))$$

$z(k) = H\Delta x(k)$

Jerk, $J(k) = \dot{a} \approx \frac{1}{\Delta T} z(k)$ where $\Delta T$ is the update time The above may be considered a basis for deriving LQR control law (note: $\alpha$ is a "switching" variable). When the feedback speed difference between engine and P2 motor is below a user-defined threshold, it may be assumed that they are synced and $\alpha=1$ (sticking phase); otherwise $\alpha=0$ (slipping phase). This is a convenient way of combining the two phases into one equation. Secondly, vehicle wheel Jerk may be estimated directly from discrete acceleration response without augmenting an additional state or additional set of states. The output matrix H is simply the discrete version of the output matrix, $C_{SL}$ or $C_{ST}$, for the continuous system. The chosen Jerk-based cost function of the system may be represented as follows:

$$\mathcal{J} = \frac{1}{2} \sum_{k=0}^{N} [\Delta x^T Q_1 \Delta x + \Delta u^T Q_2 \Delta u]$$

where $Q_1 = \rho_{LQR} H^T H$ and $Q_2 = 1$

The LQR feedback gains may now be calculated by solving the associated discrete algebraic Riccati equation (DARE) by using a suitable commercial or user-developed solver, e.g., as follows:

$K_{SL} = [K_1 K_2 K_3 K_4 K_5 K_6] = \mathrm{dlqr}(\Phi_{SL}, \Gamma_{SL}, Q_1, Q_2)$ $K_{ST} = [K_1 K_2 K_3 K_4 K_5] = \mathrm{dlqr}(\Phi_{ST}, \Gamma_{ST}, Q_1, Q_2)$ where the tuning parameter here is the coefficient $\rho_{LQR}$. The measured feedback for the system is the engine and P2 motor speed. Therefore, to apply state-feedback (LQR) control law, the remaining missing states must be reconstructed by means of an observer. For this purpose, a current estimator such as a standard Kalman filter may be utilized as follows:

Prediction:

$\bar{x}(k) = (1-\alpha)[\Phi_{SL}\hat{x}(k-1) + \Gamma_{SL}u(k-1)] + \alpha[\Phi_{ST}\hat{x}(k-1) + \Gamma_{ST}u(k-1)]$ Correction:

$\hat{x}(k) = \bar{x}(k) + L_c[y(k) - H\bar{x}(k)]$ where H=[0 0 1 0 1 0]

Steady-state kalman filter gain: $L = \mathrm{kalman}(\Phi, \Gamma_1, R_w, R_v)$ Process Noise Covariance Matrix: $R_w = \rho_{LQG} * \begin{bmatrix} R_{w11} & 0 & 0 \\ 0 & R_{w22} & 0 \\ 0 & 0 & R_{w33} \end{bmatrix}$ Sensor Noise Covariance Matrix: $R_w = \begin{bmatrix} R_{v11} & 0 \\ 0 & R_{v22} \end{bmatrix}$ The control input matrix $\Gamma$ in the above is a discrete version of $B_{SL}$ or $B_{ST}$. Here, an implicit assumption may be that noise may enter the system as engine, K0 clutch, P2 motor or external load torque disturbance. The filter gains may be computed by using any suitable commercial or user developed solver. The tuning parameters are the coefficient, $\rho_{LQG}$, and the elements of the process and sensor noise matrices.

In FIG. 3, a motor torque delta command summation $\Delta U_{m\text{-}cmd}$ is received from the HOS 202 via a summation selector 204. Also input to the summation selector 204 is a negative feedfoward gain $K_{ff}$ (transmitted as delta-command feedforward signal $dU_{ff}$) that is derived from an estimated engine disturbance $\Delta T_e$, an estimated K0 clutch disturbance $\Delta T_c$, an estimated motor disturbance $\Delta T_m$, and an estimated gain disturbance $\Delta T_L$. In the same vein, an engine disturbance $\Delta T_e$, a K0 clutch disturbance $T_c$, a motor disturbance $T_m$, and a gain disturbance $\Delta T_L$ are fed to the driveline plant model 206. If these disturbances can be "seen" at the input channel, then cancelling of recognized disturbances may be possible by using the feedforward gain from the following calculation:

$$K_{\!f\!f} = -[\Gamma^T\Gamma]^{-1}\Gamma^T\Gamma_1$$

From this equation, two feedforward gain matrices are obtained: one for the slipping phase and one for the sticking phase. In practice, estimates of these disturbances may be the only available data; nevertheless, this information may be used to obtain feedforward gains. Then inaccuracy of the estimates can be compensated by the Kalman Observer and LQR feedback. A negative feedback gain $K_{fb}$ (transmitted as delta-command feedback signal $dU_{fb}$), which is derived from engine speed $\omega_e$ and motor speed feedback $\omega_{m\text{-}fb}$ via a Kalman filter 208 as signals $dx_1$, $dx_2$, . . . $dx_6$, is also input to the summation selector 204. Summation selector 204 outputs the incremental control signal dU to the driveline plant model 206. A "feedforward signal" may refer to a command signal generated by a supervisory controller and modified to compensate for anticipated response. A "feedforward gain" matrix, on the other hand, may refer to a signal generated by a supervisory controller and multiplied by state estimates to yield the feedforward signal.

Figure 4:
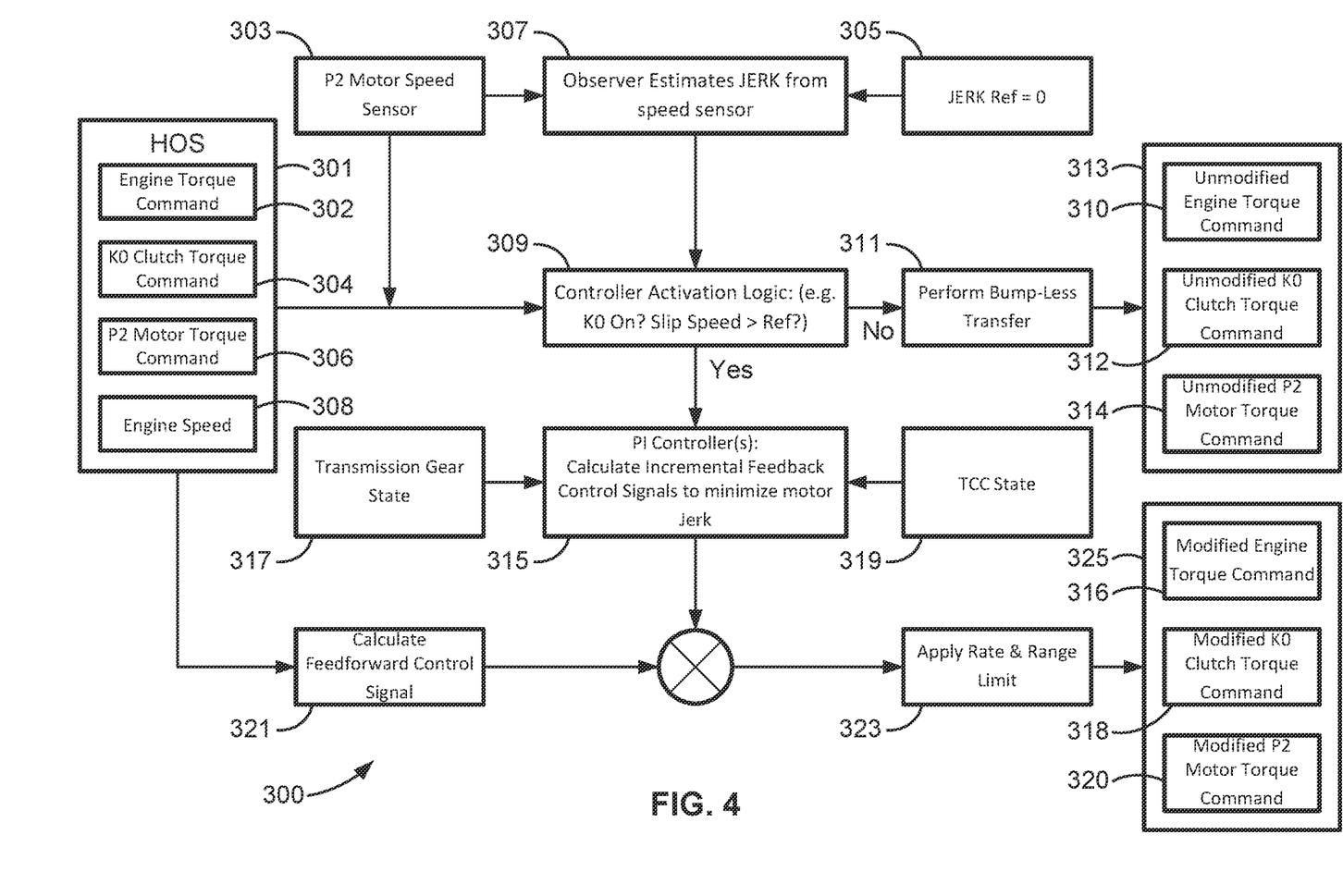
FIG. 4 is a flowchart illustrating a representative powertrain control algorithm for estimating motor-level jerk using PI control to mitigate unwanted vehicle response, which may correspond to memory-stored instructions executed by an onboard or remote controller, control-logic circuitry, programmable electronic control unit, or other integrated circuit (IC) device or a network of IC devices in accord with aspects of the disclosed concepts.
Figure 5:
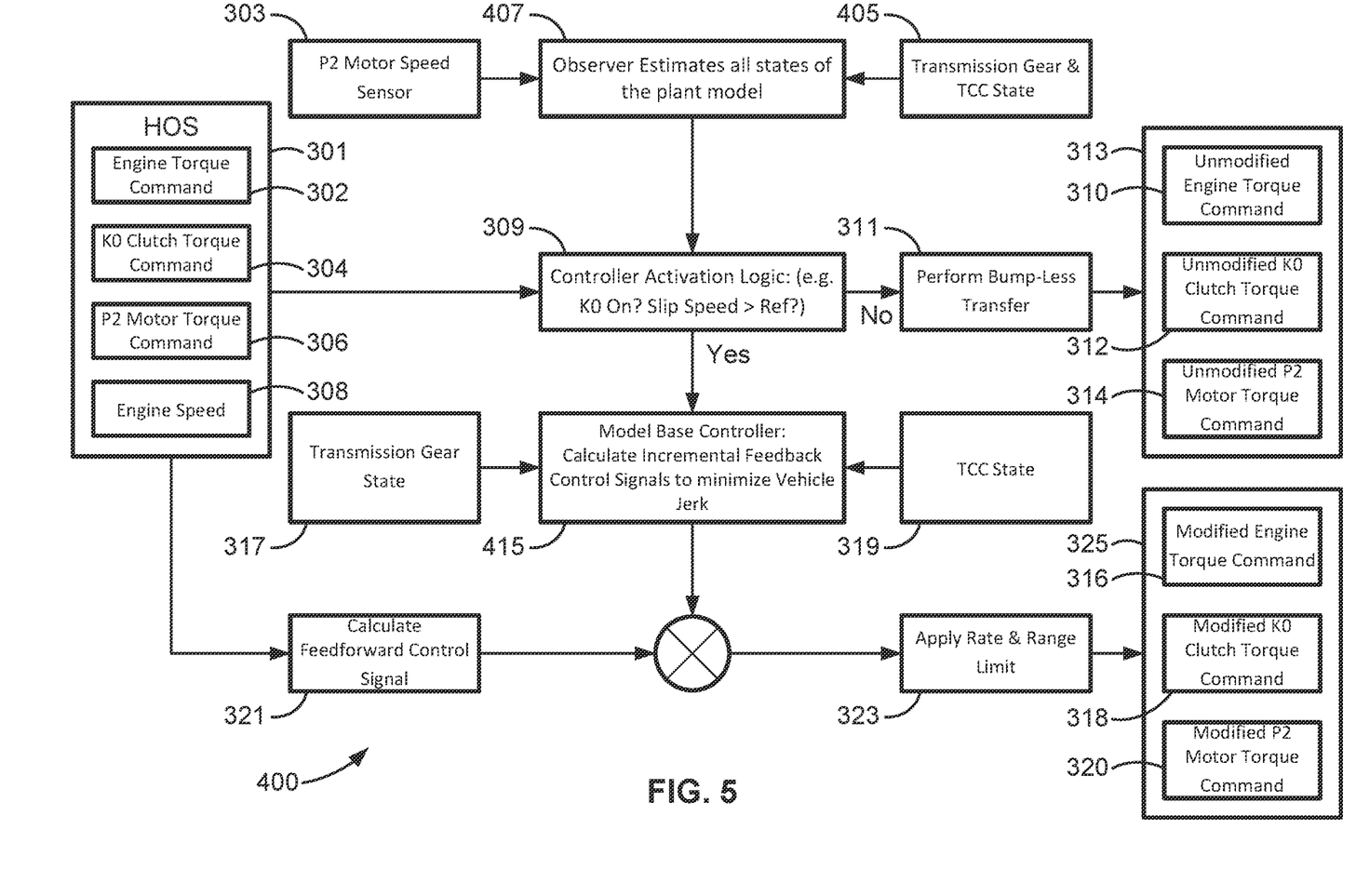
FIG. 5 is a flowchart illustrating a representative powertrain control algorithm for estimating vehicle-level jerk using model-based control to mitigate unwanted vehicle response, which may correspond to memory-stored instructions executed by an onboard or remote controller, control-logic circuitry, programmable electronic control unit, or other integrated circuit (IC) device or a network of IC devices in accord with aspects of the disclosed concepts.

With reference now to the flowchart of FIG. 4, an improved method or control strategy for estimating motor-level jerk using multiple uncoupled PI controllers to mitigate undesirable vehicle responses is generally described at 300 in accordance with aspects of the present disclosure. Likewise, the flowchart of FIG. 5 presents at 400 an improved method or control strategy for estimating vehicle-level jerk using linear or non-linear model-based controllers to mitigate undesirable vehicle responses in accordance with aspects of the present disclosure. Some or all of the operations illustrated in FIGS. 4 and 5 and described in further detail below, wherein like reference numbers indicate the same or similar operations, may be representative of an algorithm or algorithms that correspond to processor-executable instructions that may be stored, for example, in main or auxiliary or remote memory, and executed, for example, by an on-board or off-board controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

At input-output block 301, the methods 300 and 400 of FIGS. 4 and 5 provide control logic for a supervisory HOS controller to determine an engine torque command 302, an K0 clutch torque command 304, a traction motor torque command 306, and an engine speed 308. Prior to, contemporaneous with, or after aggregation of the foregoing data, one or more speed sensors generate and output sensor signals indicative of a real-time traction motor speed, as indicated at process block 303. Proceeding to process block 305 of FIG. 4, a zeroed jerk reference (JERK Ref=0) is output to a state observer module. Comparatively, process block 405 of FIG. 5 ascertains a real-time transmission gear state of a power transmission and a TCC clutch state (on/off) of a torque converter lockup clutch, with such data being output to a state observer module.

Predefined process block 307 of FIG. 4 employs the state observer module to estimate motor-level jerk from the received motor speed data, and outputs a jerk error as the mathematical difference between the jerk reference and the estimated jerk. By way of contrast, predefined process block 407 of FIG. 4 employs the state observer module to estimate vehicle-level jerk from the received motor speed, transmission gear state, and TCC clutch state data to derive multiple states of the driveline plant model. An "observer" may be used to smooth out (filter) a measured state of the system and reconstruct unmeasured states of a system by using a mathematical model of the physics and one or more measured feedback signals. In the case of a PI controller, a Kalman-filter-based observer may be used by employing a mathematical relationship between speed, acceleration, and jerk; this is a so-called "kinematic" model of the process that does not require information of the system's physics. In the case of model-based controller, a Kalman-filter-based observer may be used by employing system physics to estimate unmeasured states of the system from engine and motor speed feedback information. By way of non-limiting example, a six-state, model-based LQG controller may uses this observer to reconstruct (four) unmeasured states of the system: (i) engine isolator (DMF) twist angle between primary and secondary, (ii) DMF secondary speed, (iii) driveline twist (windup) angle, and (iv) vehicle wheel speed. Feedback signals that are then fed back to the observer include engine speed and motor speed.

Continuing to decision blocks 309 of FIGS. 4 and 5, the methods 300 and 400 provide memory-stored, controller executable activation logic to determine, based on the vehicle dynamics data received from the HOS and the motor speed data received from the motor speed sensor: (1) is the K0-launch EDC in a torque-transmitting active state or a non-torque-transmitting inactive state; and (2) is a TCC slip speed of the TCC greater than a calibrated slip speed reference. If either inquiry returns a false response (Block 309=NO), both methods 300 and 400 proceed to predefined process block 311 to perform a bumpless transfer, e.g., from the event-based (PI or model-based) jerk controller back to the supervisory (HOS) controller. A "bumpless" transfer may include a rate of change of a torque command being controlled such that there are no sudden large changes in values while handing over control back to a supervisory controller. At input-output block 313, the methods 300 and 400 of FIGS. 4 and 5 provide control logic for the supervisory HOS controller to transmit an unmodified engine torque command 310, an unmodified K0 clutch torque command 312, and an unmodified traction motor torque command 314.

Upon determining that the K0-launch EDC is on and the TCC slip speed exceeds the reference slip speed (Block 309=YES), methods 300 and 400 proceed to predefined process blocks 315 and 415, respectively, to derive feedback control for minimizing jerk. In FIG. 4, for example, predefined process block 315 employs one or more PI controllers to calculate incremental feedback control signals to minimize motor-level jerk. Comparatively, predefined process block 415 of FIG. 5 employs one or more model-based controllers to calculate incremental feedback control signals to minimize vehicle-level jerk. In both instances, predefined process blocks 315, 415 utilize transmission gear state data, which is generated at process block 317, and TCC state data, which is generated at process block 319.

Prior to, contemporaneous with, or after determining the incremental feedback control signals at process blocks 315, 415, a feedforward signal is calculated at predefined process block 321 and fed to a summing junction with the incremental feedback control signals. The summed inputs of the converging paths are then subjected to rate and range limits at process block 323. For instance, while the (PI or model-based) controller is active, the output torque range is clipped or saturated to obey a motor torque limit constraint, while the output torque rate is clipped or saturated to obey a motor torque production limit constraint. At input-output block 325, the methods 300 and 400 of FIGS. 4 and 5 both provide control logic for the supervisory HOS controller to transmit a modified engine torque command 316, a modified K0 clutch torque command 318, and a modified traction motor torque command 320.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling a hybrid powertrain of a vehicle with multiple road wheels, the hybrid powertrain including an engine and a motor operable to drive one or more of the road wheels, an engine disconnect clutch (EDC) operable to disengage the engine from the motor, and a controller programmed to control the motor, the engine, and the EDC, the method comprising:

receiving, via the controller from a motor speed sensor, a sensor signal indicative of a motor speed of the motor;

receiving, via the controller, data indicative of an engine torque command for the engine, a motor torque command for the motor, and a clutch torque command for the EDC;

determining, via the controller using a state observer module, an estimated jerk as a second derivative of speed based on the motor speed of the motor;

determining, via the controller based on the clutch torque command, whether the EDC is in a torque-transmitting active state or a non-torque-transmitting inactive state;

executing, responsive to the EDC being in the non-torque-transmitting inactive state, a bumpless transfer during which a rate of change of the motor torque command is maintained within a calibrated maximum rate change percentage for a predetermined time;

calculating, via the controller responsive to the EDC being in the torque-transmitting active state and based on the engine, motor, and clutch torque commands, an incremental feedback control signal predicted to reduce the estimated jerk; and transmitting, via the controller, a torque command signal to the engine, the motor, and/or the EDC to modulate a torque output thereof based on the incremental feedback control signal.

2. The method of claim 1, wherein the hybrid powertrain further includes a power transmission and a torque converter (TC) with a torque converter clutch (TCC), the TC interposed between the engine and the power transmission, the method further comprising determining, via the controller, whether a TCC slip speed of the TCC is greater than a calibrated slip speed, and wherein calculating the incremental feedback control signal is further in response to the TCC slip speed being greater than the calibrated slip speed.

3. The method of claim 2, wherein calculating the incremental feedback control signal is further based on a TCC state of the TCC and a transmission gear state of the power transmission.

4. The method of claim 1, wherein calculating the incremental feedback control signal includes a proportional-integral (PI) controller generating respective incremental corrections for the engine, the motor, and the EDC, and wherein the torque command signal includes a modified engine torque command based on the incremental correction for the engine, a modified motor torque command based on the incremental correction for the motor, and a modified clutch torque command based on the incremental correction for the EDC.

5. The method of claim 4, wherein the PI controller includes:

an engine PI controller operable to generate the respective incremental correction for the engine;

a motor PI controller operable to generate the respective incremental correction for the motor; and a clutch PI controller operable to generate the respective incremental correction for the engine disconnect clutch.

6. The method of claim 1, wherein the estimated jerk is an estimated motor jerk of the motor derived as the second derivative of speed of the motor speed of the motor.

7. The method of claim 1, wherein the state observer module includes:
an observer model based on a kinematic state-transition matrix without plant physics data derived as a linear mathematical representation of the hybrid powertrain;
an observer model based on the plant physics data derived as the linear mathematical representation of the hybrid powertrain; and/or
a PI observer filter.

8. The method of claim 1, wherein calculating the incremental feedback control signal includes a model-based controller generating respective incremental corrections for the engine, the motor, and the EDC, and wherein the torque command signal includes a modified engine torque command based on the incremental correction for the engine, a modified motor torque command based on the incremental correction for the motor, and a modified clutch torque command based on the incremental correction for the EDC.

9. The method of claim 8, wherein the model-based controller includes a linear time-invariant (LTI) state feedback controller, a piecewise linear (PL) state feedback controller, and/or a full non-linear state feedback controller.

10. The method of claim 8, wherein the hybrid powertrain further includes a power transmission and a torque converter (TC) with a torque converter clutch (TCC), the TC interposed between the engine and the power transmission, the method further comprising receiving data indicative of a TCC state of the TCC and a transmission gear state of the power transmission, wherein determining the estimated jerk is further based on the TCC state and the transmission gear state.

11. The method of claim 1, wherein the estimated jerk is an estimated vehicle jerk of the vehicle derived as the second derivative of speed of a vehicle speed of the vehicle.

12. The method of claim 1, wherein the controller includes a PI or model-based controller operable to calculate the incremental feedback control signal and transmit the torque command signal, the method further comprising clipping and/or saturating an output range and an output rate of the PI or model-based controller to conform with a torque limit constraint and a torque production constraint of the motor.

13. A method of controlling a hybrid powertrain of a vehicle with multiple road wheels, the hybrid powertrain including an engine and a motor operable to drive one or more of the road wheels, an engine disconnect clutch (EDC) operable to disengage the engine from the motor, and a controller programmed to control the motor, the engine, and the EDC, the method comprising:
receiving, via the controller from a motor speed sensor, a sensor signal indicative of a motor speed of the motor;
receiving, via the controller, data indicative of an engine torque command for the engine, a motor torque command for the motor, and a clutch torque command for the EDC;
determining, via the controller using a state observer module, an estimated jerk as a second derivative of speed based on the motor speed of the motor;
determining, via the controller based on the clutch torque command, whether the EDC is in a torque-transmitting active state or a non-torque-transmitting inactive state;
receiving a jerk reference;
determining a jerk error as a mathematical difference between the jerk reference set equal to zero and the estimated jerk;
calculating, via the controller responsive to the EDC being in the torque-transmitting active state and based on the jerk error and the engine, motor, and clutch torque commands, an incremental feedback control signal predicted to reduce the estimated jerk, the calculating including a proportional-integral (PI) controller generating respective incremental corrections for the engine, the motor, and the EDC; and
transmitting, via the controller, torque command signals to the engine, the motor and the EDC to modulate a torque output thereof based on the incremental feedback control signal, the torque command signals including a modified engine torque command based on the incremental correction for the engine, a modified motor torque command based on the incremental correction for the motor, and a modified clutch torque command based on the incremental correction for the EDC.

14. The method of claim 13, further comprising, responsive to the EDC being in the non-torque-transmitting inactive state, executing a bumpless transfer during which a rate of change of the motor torque command is maintained within a calibrated maximum rate change percentage for a predetermined time window.

15. A motor vehicle comprising:
a vehicle body with a plurality of road wheels attached to the vehicle body;
an internal combustion engine (ICE) assembly mounted to the vehicle body and including a crankshaft configured to output torque generated by the ICE assembly;
traction motor mounted to the vehicle body and including a rotor configured to output torque generated by the traction motor;
a power transmission mounted to the vehicle body and drivingly connected to the crankshaft and the rotor to receive, modify, and output the torque generated by the traction motor and the ICE assembly to one or more of the road wheels to thereby propel the vehicle;
an engine disconnect clutch (EDC) operable to drivingly disconnect the ICE assembly from both the traction motor and the power transmission; and
a vehicle controller operatively connected to the ICE assembly, the traction motor, the power transmission, and the EDC, the vehicle controller being programmed to:
receive a sensor signal indicative of a motor speed of the traction motor;
receive data indicative of an engine torque command for the ICE assembly, a motor torque command for the traction motor, and a clutch torque command for the EDC;
determine an estimated jerk as a second derivative of speed based on the motor speed of the traction motor using a state observer module;
determine whether the EDC is in a torque-transmitting active state or a non-torque-transmitting inactive state based on the clutch torque command;
responsive to the EDC being in the non-torque-transmitting inactive state, execute a bumpless transfer during which a rate of change of the motor torque command is maintained within a calibrated maximum rate change percentage for a predetermined time;

responsive to the EDC being in the torque-transmitting active state, calculate an incremental feedback control signal, predicted to reduce the estimated jerk, based on the engine, motor, and clutch torque commands; and transmit a torque command signal to the ICE assembly, motor, and/or EDC to modulate a torque output thereof based on the incremental feedback control signal.

16. The motor vehicle of claim 15, further comprising a torque converter (TC) with a torque converter clutch (TCC), the TC interposed between the ICE assembly and the power transmission, wherein the controller is further programmed to determine whether a TCC slip speed of the TCC is greater than a calibrated slip speed, and wherein calculating the incremental feedback control signal is further in response to the TCC slip speed being greater than the calibrated slip speed.

17. The motor vehicle of claim 16, wherein calculating the incremental feedback control signal is further based on a TCC state of the TCC and a transmission gear state of the power transmission.

18. The motor vehicle of claim 15, wherein calculating the incremental feedback control signal includes a proportional-integral (PI) controller or a model-based controller generating respective incremental corrections for the ICE assembly, the traction motor, and the EDC, and wherein the torque command signal includes a modified engine torque command based on the incremental correction for the ICE assembly, a modified motor torque command based on the incremental correction for the traction motor, and a modified clutch torque command based on the incremental correction for the EDC.

19. The motor vehicle of claim 15, wherein the state observer module includes:
  an observer model based on a kinematic state-transition matrix without plant physics data derived as a linear mathematical representation of the hybrid powertrain;
  an observer model based on the plant physics data derived as the linear mathematical representation of the hybrid powertrain; and/or
  a PI observer filter.

20. The motor vehicle of claim 15, wherein the estimated jerk is an estimated motor jerk of the motor derived as a second derivative of speed of the motor s speed of the motor or an estimated vehicle jerk of the motor vehicle derived as a second derivative of speed of a vehicle speed of the vehicle.

* * * * *